United States Patent
Lewis

(10) Patent No.: US 6,548,780 B2
(45) Date of Patent: Apr. 15, 2003

(54) TECHNIQUES FOR RESISTANCE WELDING ATTACHMENTS TO SMALL PRESSURE VESSELS

(75) Inventor: Arthur L. Lewis, Monterey, TN (US)

(73) Assignee: Manchester Tank and Equipment Company, Brentwood, TN (US)

( * ) Notice: Subject to any disclaimer, the term of this patent is extended or adjusted under 35 U.S.C. 154(b) by 0 days.

(21) Appl. No.: 09/797,403

(22) Filed: Feb. 28, 2001

(65) Prior Publication Data

US 2002/0117479 A1 Aug. 29, 2002

(51) Int. Cl.[7] .............................. B23K 11/00; F17C 1/00
(52) U.S. Cl. ..................... 219/93; 219/59.1; 219/117.1; 220/581
(58) Field of Search ................................ 219/59.1, 86.9, 219/87, 93, 103, 107, 117.1; 220/581; 228/184

(56) References Cited

U.S. PATENT DOCUMENTS

| | | | | |
|---|---|---|---|---|
| 2,118,388 A | * | 5/1938 | Zerbe ........................ | 473/585 |
| 3,050,207 A | * | 8/1962 | Oxenham .................... | 220/581 |
| 3,522,647 A | * | 8/1970 | Holcomb et al. ........... | 228/184 |
| 4,168,795 A | * | 9/1979 | Bennett ...................... | 228/175 |

OTHER PUBLICATIONS

"Understanding the Fundamentals and Techniques Used in Resistance Welding", Lawrence H. Alexander, AWS Convention, Chicago, IL, Apr. 26 & 27, 2000, 84 pages.

* cited by examiner

*Primary Examiner*—M. Alexandra Elve
*Assistant Examiner*—Kevin P. Kerns
(74) *Attorney, Agent, or Firm*—Larry K. Roberts

(57) ABSTRACT

A technique for resistance welding an attachment such as a collar or base ring to a tank head section by causing welding current to flow through weld protrusions disposed on the attachment and which are pressed against the tank section. Electrodes are contacted to the attachment and the tank section in such a manner to provide for substantially equal welding current paths through the protrusions.

15 Claims, 8 Drawing Sheets

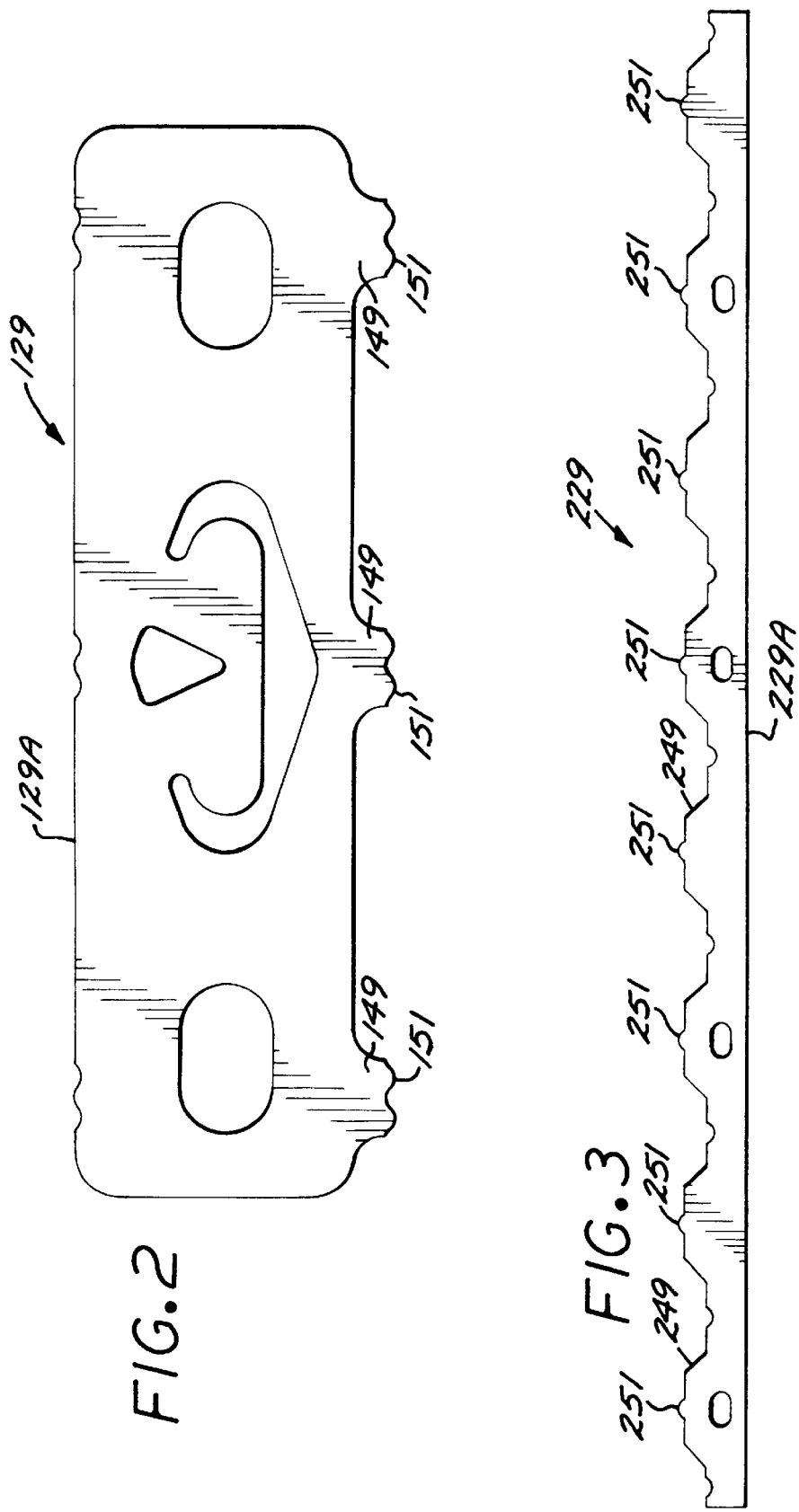

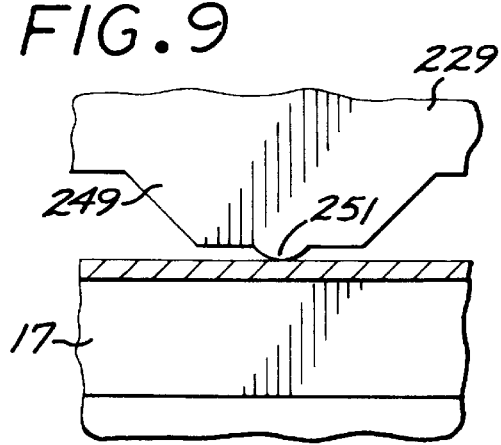
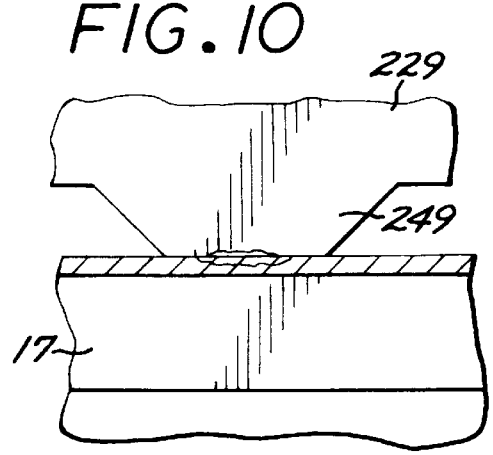
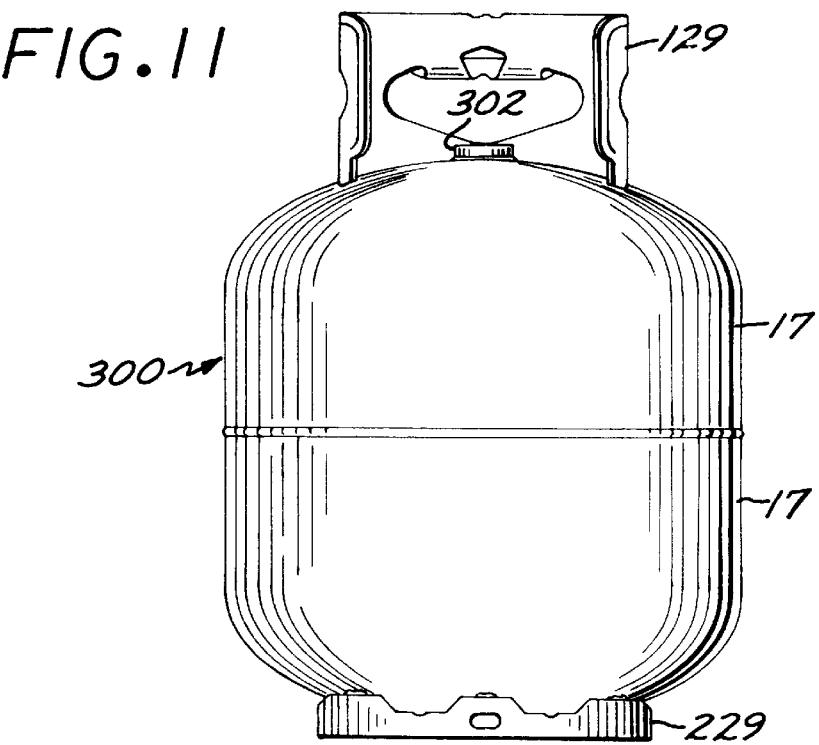

TECHNIQUES FOR RESISTANCE WELDING ATTACHMENTS TO SMALL PRESSURE VESSELS

BACKGROUND OF THE INVENTION

The disclosed invention relates generally to pressure tanks, and more particularly to resistance welding of attachments to a metal pressure tank.

Small metal pressure tanks or vessels are utilized for a variety of purposes such as storing propane gas. These small metal pressure tanks commonly include attachments that are welded to the tank. Examples of such attachments include a handle or top collar, and a foot ring or base. These attachments are commonly attached to the tank by metal-inert-gas (MIG) welding.

Considerations with MIG welding include the need for filler material and an inert gas shield.

SUMMARY OF THE INVENTION

The disclosed invention is directed to welding an attachment to a tank section by causing welding current to flow through weld protrusions that are pressed against the tank section.

BRIEF DESCRIPTION OF THE DRAWINGS

The advantages and features of the disclosed invention will readily be appreciated by persons skilled in the art from the following detailed description when read in conjunction with the drawing wherein:

FIG. 2 is a schematic illustration of an attachment that can be welded to a tank section pursuant to the invention.

FIG. 3 is a schematic illustration of another attachment that can be welded to a tank section pursuant to the invention.

FIG. 9 schematically shows the contact of a weld protrusion of the attachment of FIG. 3 with a tank section.

FIG. 10 schematically shows the weld of a weld protrusion of the attachment of FIG. 3 to a tank section.

FIG. 11 schematically shows a tank formed of tank sections having attachments welded thereto in accordance with the invention.

DETAILED DESCRIPTION OF THE DISCLOSURE

Figure 1A:
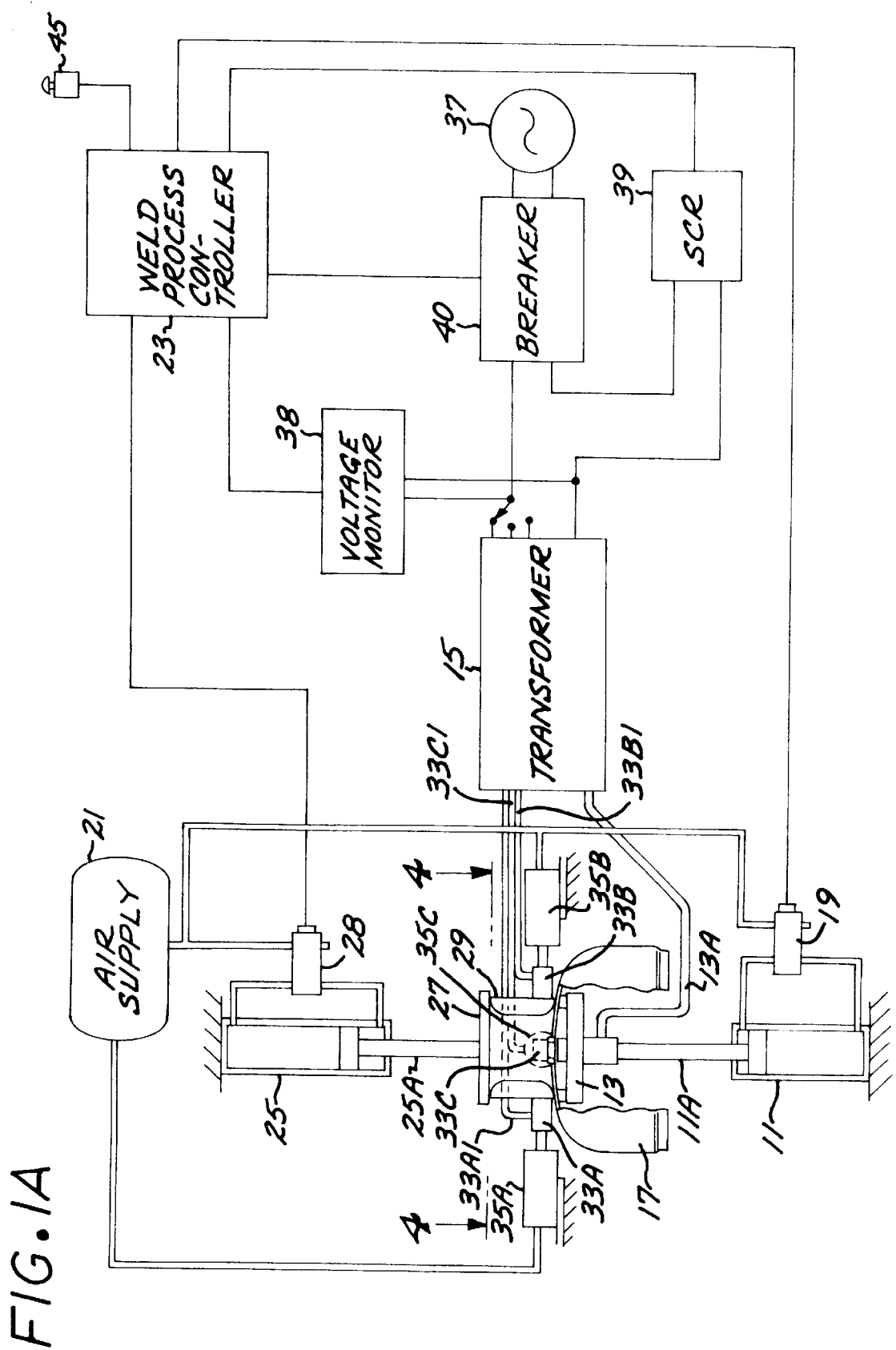
FIG. 1 is a schematic block diagram of a resistance welding system that employs the invention for welding attachments to a tank section.

In the following detailed description and in the several figures of the drawing, like elements are identified with like reference numerals.

Referring now to FIG. 1, schematically illustrated therein is a welding system that resistance welds a cut and formed sheet metal attachment to a metal tank section by passing a high current through weld protrusions on the attachment that are pressed against the tank section.

The system includes a first air cylinder 11 having a cylinder rod 11A that supports a tank cathode electrode structure 13 at the end thereof. The electrode structure 13 is electrically connected to a ground of a step-down transformer 15 by a cable 13A, and is controlled to press electrode contact surfaces 13B, 13C, 13D against an inside surface of a half tank section 17 by extending movement of the cylinder rod 11A. In this embodiment, the cylinder rod 11A is not electrically isolated from the transformer, since the cable 13A is connected to a ground, and so that a failure of the transformer will trip circuit breakers or fuses. The electrode 13 is fabricated of a material with good electrical conductivity, such as copper or an alloy thereof.

The first air cylinder 11 is energized by an air solenoid 19 which receives pressurized air from an air supply 21 and is controlled by a weld process controller 23. The air solenoid 19 is automatically actuated by the controller 23, subsequent to the operator initiating a welding sequence by actuating a start switch 45.

A second air cylinder 25 includes a cylinder rod 25A that supports a pressure plate 27 at the end thereof. The pressure plate 27 is controllably pressed against an attachment 29 that is to be welded to the half tank section 17. The first air cylinder 1 and the second air cylinder 25 are configured so that their respective cylinder rods 11A, 25A move collinearly toward each other when actuated. In this manner, actuation of the first and second air cylinders 11, 25 causes the attachment 29 to be pressed against the tank section 17. In this exemplary embodiment, a clamping force exerted vertically by the cylinders 11 and 25 is sufficiently high to quickly push the half tank section 17 and the attachment 29 together during the welding process to prevent expulsion of molten metal. By way of example, for this embodiment, forces in the range of 800 to 1200 pounds are exerted by the cylinders. The second air cylinder 25 is more particularly energized by an air solenoid 28 that receives pressurized air from the air supply 21 and is controlled by the weld process controller 23. All fixture components on the anode side are electrically isolated to protect the operator in the event of a failure such as a transformer failure. Thus, the cylinder rod 25A is electrically isolated from the attachment 29. Techniques for electrically isolating pieces undergoing resistance welding are known in the art, and include use of insulating materials such as rubber washers, sleeves and bushings to isolate the copper electrode structure from the mounting structures and fasteners used to attach the electrodes to the cylinder rods.

Figure 1B:
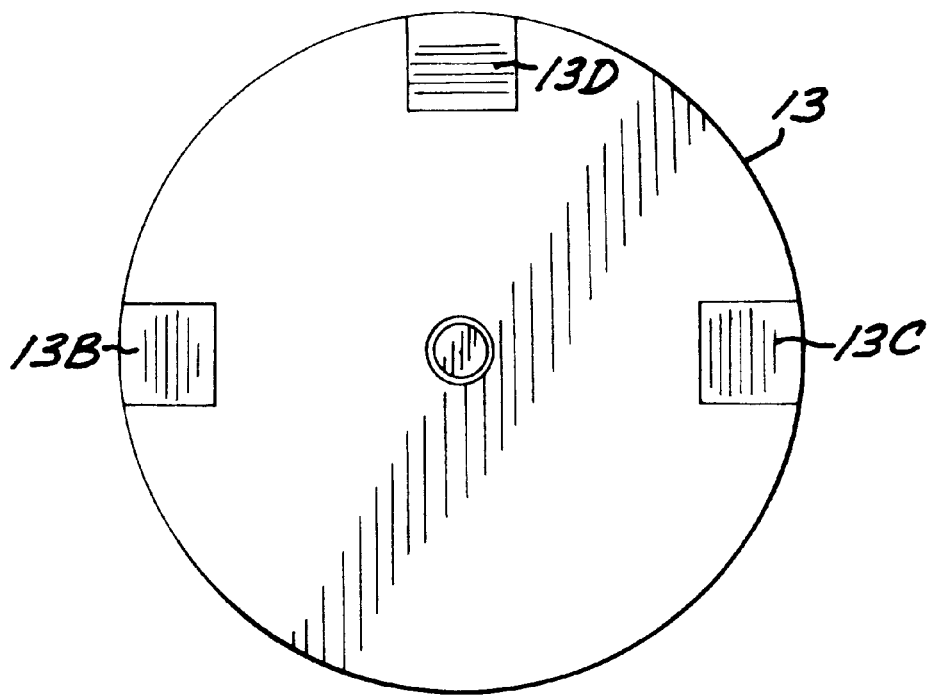
Figure 1C:
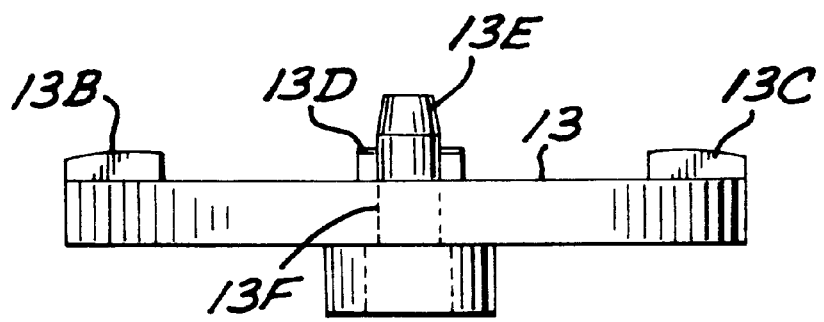

In one exemplary form, the attachment 29 is a collar structure 129 which is attached to a top half section of the pressure vessel. The attachment 129 more particularly includes weld protrusions 151 (FIG. 2) that are pressed against the top tank section 17, as described further herein. The tank electrode structure 13 can be configured to contact the inner surface of the tank section 17 at locations that are close to and/or opposite locations on the outer surface of the tank section that are contacted by the weld protrusions of the attachment. FIGS. 1B and 1C illustrate a form of cathode electrode structure suitable for this application. The cathode electrode 13 is fabricated of copper, with three raised electrode surfaces 13B, 13C, 13D spaced apart for contacting the inner surface of the tank half section at locations immediately below the sets of weld protrusions of the attachment. As shown in FIG. 1C, the electrode surfaces are curved to match the contour of the tank half section surfaces to be contacted by the electrode surfaces. A steel guide pin 13E is passed through center opening 13F to locate the electrode structure relative to the tank half section, by entering the flange opening of the tank half section. A steel cylinder mount structure is attached to the bottom of the electrode and the guide pin, to provide a mounting for mounting the electrode to the cylinder rod 11A.

Figure 8B:
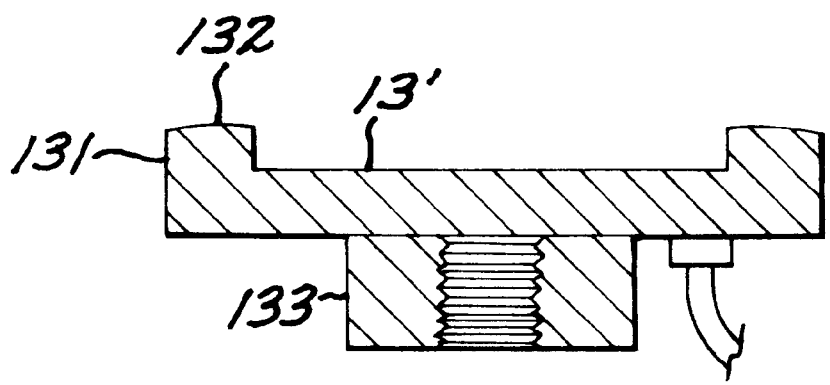
FIG. 8B is a cross-sectional view taken along line 8B—8B of FIG. 8A.

For another exemplary form, the attachment 29 is a partial or full cylinder or ring 229 attached to a bottom half section of the pressure vessel. The portion of the tank electrode 13 that contacts the tank section 17 can be annular or ring shaped as shown in FIG. 8B.

It is noted that FIGS. 2 and 3 represent the collar and bottom ring attachments in a flat state before being formed into a final curved state. The attachments can be stamped from a sheet of material, e.g. a high strength low alloy steel. In an exemplary embodiment, the attachments have a thickness of 0.082 inch to 0.096 inch. The half tank sections can be fabricated of the same or similar material.

In accordance with an implementation of the welding system, a plurality of electrodes, in this exemplary embodiment electrodes 33A, 33B and 33C, are controllably pressed against the attachment 29 by respective clamp cylinders 35A, 35B, 35C, for example at locations close to the weld protrusions. The cylinders 35A, 35B, 35C are actuated under automatic control of the weld process controller 23, after the cylinders 11 and 25 have been actuated to fix the attachment and the tank half section in welding position. The cylinders 35A, 35B, 35C exert enough force on the electrodes to prevent arcing between the metal surface of the attachment and the electrodes. The electrodes 33A, 33B, 33C are fabricated of a material of high electrical conductivity, such as copper or an alloy thereof. The electrodes are electrically connected to the transformer 15 by cables 33A1, 33B1, 33C1. According to an aspect of the welding technique, substantially equal current path lengths are provided from the transformer to the weld locations defined by the weld protrusions. Providing the substantially equal current path lengths is facilitated by use of anode cables 33A1, 33B1, 33C1 of equal length, and preferably as short as practicable since longer cables are a source of power loss. The transformer ends of the anode cables are connected to the same transformer tap, and are of equal length to balance and divide the current load, so that the same voltage and current are delivered to each weld point or set of weld points. The length of the cathode cable 13A need not be matched to the length of the anode cables 33A1, 33B1, 33C1, although its length is preferably also made as short as practicable. The cables are sized to carry the rated transformer amperage. For this exemplary embodiment, the cables are heavy "0", "00" or multi-band copper straps.

Electrical power for welding is provided by an appropriate power source 37 which can be for example a 60 Hertz, 480 volt, 800 ampere service. The weld controller 23 actuates a silicon controlled rectifier (SCR) 39 that provides power to the transformer 15 for a predetermined amount of time or number of cycles of the line voltage signal, such as about one-fifth second or 11 cycles of a 60 Hertz line signal. The step-down transformer 15 steps down the voltage to about 10 volts, and increases the current to an extremely high level, e.g. on the order of 34,000 amperes for this exemplary embodiment. The resistance in the electrical circuit comprising the anode cables, anode electrodes, the attachment, the tank half section, the cathode electrode and the cathode cables is greatest at the protrusion contact points because these are the smallest areas for current to flow through. Heat caused by conduction of the extremely high current through the weld protrusions on the attachment and regions of tank contiguous to the weld protrusions is rapidly generated until the points are fused to the half tank section. The heat causes the protrusions and the tank regions contiguous thereto to soften, and the pressure pushing the protrusions against the tank section causes the weld protrusions and the contiguous tank regions to flow together to accomplish the welds. In this manner, resistance welding of the attachment to the tank section is accomplished quickly.

The voltage monitor 38 detects voltages higher or lower than an acceptable range, and will trip the breaker 40 in the event out of range voltages are detected. This maintains weld quality.

Referring now to FIG. 2, schematically set forth therein is an example of an attachment 129 that can be attached to the tank section 17 in accordance with the invention to form a collar. The attachment 129 comprises a cut sheet metal panel having weld protrusions or bumps 151 at the ends of tabs 149 disposed along an edge of the panel. By way of illustrative example, a pair of side by side protrusions 151 are disposed at the end of each tab 149. Each protrusion can for example have a nominal radius of ¼ inch, and can extend from the trough between protrusions by about 0.078 inch. In use, the attachment 129 is bent or formed into a partial ring or cylinder shape wherein the protrusions 151 extend axially. In an exemplary embodiment, the thickness of the wall of the tank section 17 is about 0.078 inch. The projection height is selected for optimal weld contact after the melt or weld takes place, and is not a function of the tank section thickness.

Figure 4:
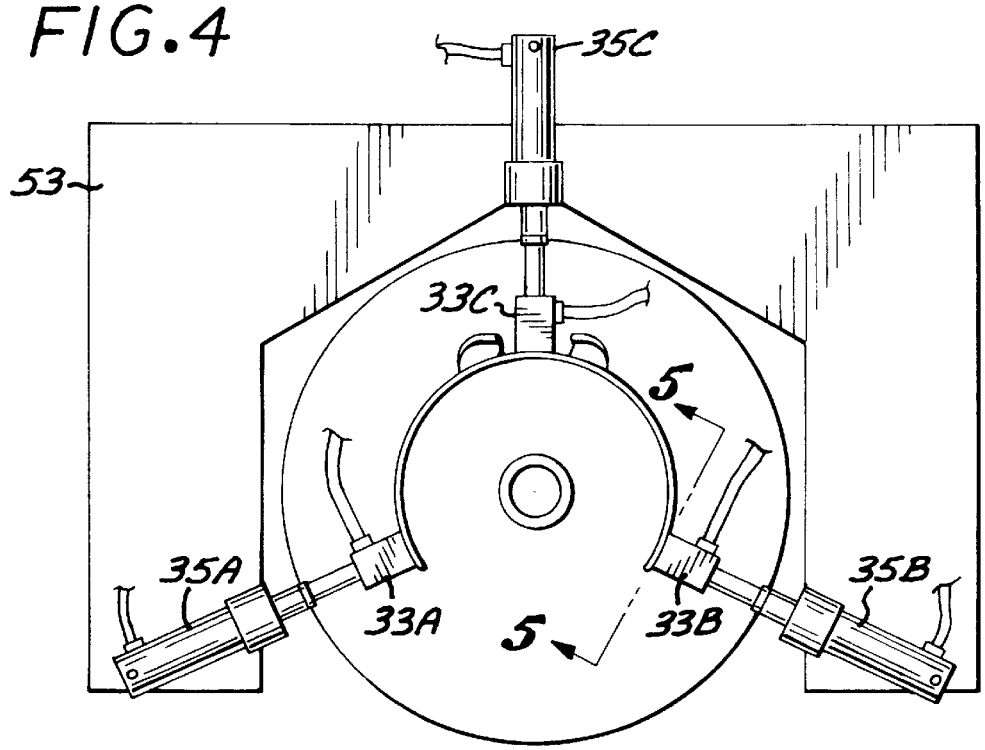
FIG. 4 is a schematic top plan view showing placement of the attachment of FIG. 2 in the welding system of FIG. 1.
Figure 5:
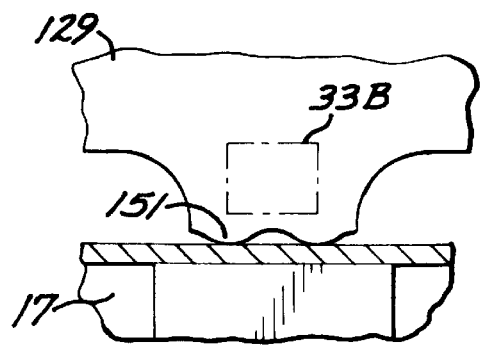
FIG. 5 schematically shows the contact of weld protrusions of the attachment of FIG. 2 with a tank section.

The partial ring shaped attachment 129 is placed on the tank section 17 with the weld protrusions 151 against the external surface of the tank section, for example in a fixture 53 (FIG. 4). The air cylinders 11, 25 are then actuated so that the pressure plate 27 presses against the edge 129a of the attachment that is opposite the protrusions, which causes the weld protrusions 151 to be axially pressed against the tank section 17 as schematically depicted in FIG. 5.

The number of electrodes 33A, 33B, 33C employed correspond to the number of pairs of contiguous weld protrusions 151, for example, and the electrodes are contacted to the attachment 129 at locations that provide for substantially equal current paths between the electrodes 33 and the tank electrode 13. For example, in an implementation wherein the shortest current paths between the tank electrode 13 and the tank regions contacted by the protrusions 51 are of substantially equal length, the electrodes 33A, 33B, 33C contact the attachment 129 at locations that provide for current paths to respectively associated pairs of weld protrusions 151 that are substantially identical in length. Also, the electrodes 33A, 33B, 33C contact the attachment 129 close to the associated weld protrusion pairs as depicted in FIG. 5. Any other incidental contact between the part to be welded and an anode electrode structure would be electrically isolated.

Figure 6:
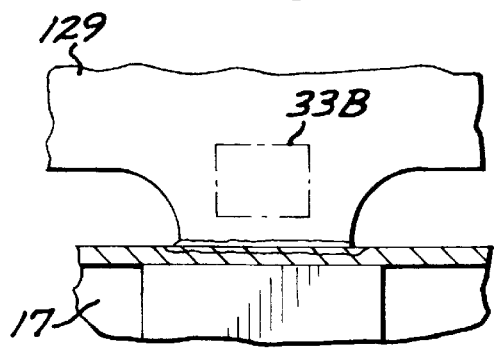
FIG. 6 schematically shows the weld of weld protrusions of the attachment of FIG. 2 to a tank section.

While the protrusions 151 are being pressed against the tank section, welding is enabled by operator actuation of a weld switch 45. Welding current flows through the protrusions and the tank regions in close proximity thereto, which flow together pursuant to resistance produced heat and the pressure by the air cylinders 11, 25, as schematically depicted in FIG. 6. The weld controller 45 automatically opens and closes the SCR 39 in response to the actuation signal, so that current is applied for a predetermined time interval.

In accordance with an aspect of the invention, the weld joints formed by the resistance welding technique in this embodiment are free of externally supplied weld filler material. As used herein, "non-native" weld filler material refers to externally supplied weld filler material, e.g. from a weld filler rod or wire. Instead the weld joints are formed of native material from the weld protrusions, which becomes part of the tank metal.

Referring now to FIG. 3, schematically set forth therein is an example of an attachment 229 that can be attached to a bottom tank section 17 in accordance with the invention. The attachment 229 comprises a sheet metal panel having weld protrusions 251 on the ends of tabs 249 disposed along an edge. By way of examples, the protrusions 251 have a nominal radius of about ¼ inch or ½ inch, and can extend from the tab by about 0.078 inch. In use, the attachment 229 is bent into a ring or cylinder shaped footring wherein the protrusions extend axially. The attachment 229 is fabricated of the same material and thickness as the collar attachment 29 (FIG. 2), in this exemplary embodiment.

The base ring shaped attachment 229 is placed on the tank section 17 with the weld protrusions against the tank section, for example in a fixture. The air cylinders 11, 25 are then actuated so that the pressure plate 27 presses against the edge 229a that is opposite the weld protrusions, which causes the weld protrusions to be axially pressed against the tank section, as schematically depicted in FIG. 9.

Separate anode electrodes 33A, 33B, 33C can employed as discussed above with respect to the partial ring shaped attachment 129. Such electrodes are contacted to the attachment 229 at locations that provide for substantially equal current paths between the anode electrodes and the cathode electrode 13. For example, in an implementation wherein the current paths between the tank electrode and tank regions contacted by the protrusions are of substantially equal length, the anode electrodes are contacted at locations that provide for substantially equal current paths to the weld protrusions.

Figure 7A:
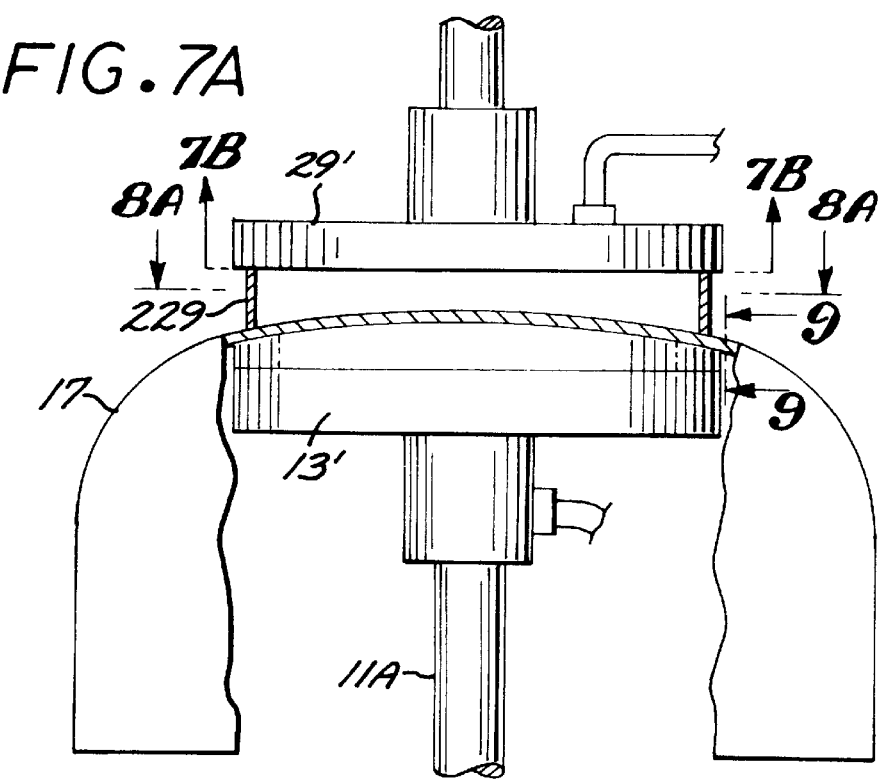
FIG. 7A schematically illustrates placement of the attachment of FIG. 3 in the welding system of FIG. 1.
Figure 8A:
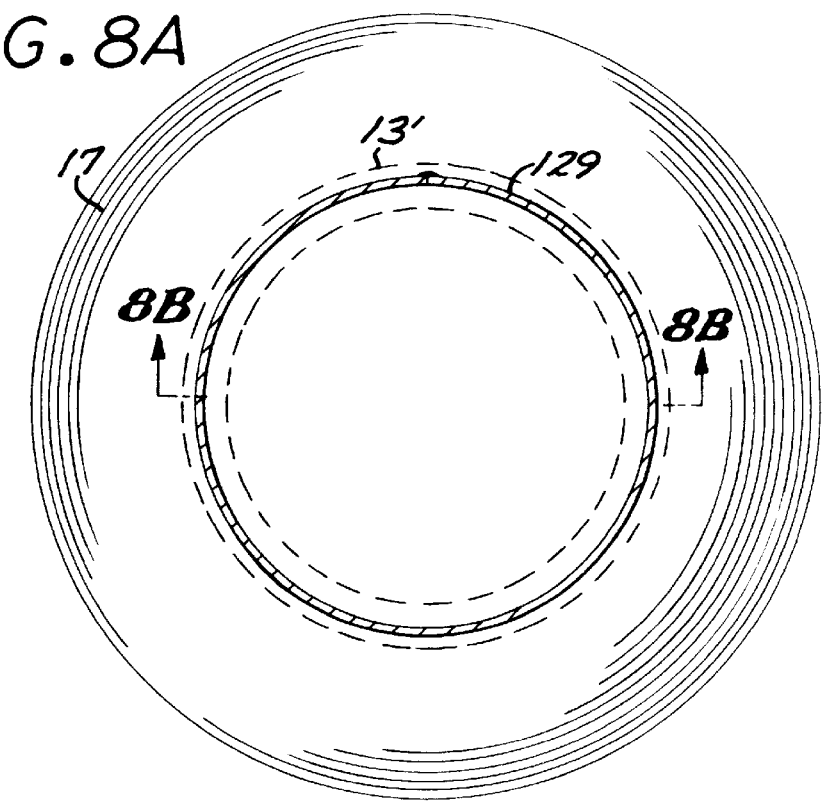
FIG. 8A schematically shows an example of a tank electrode of the welding system of FIG. 1.
Figure 7B:
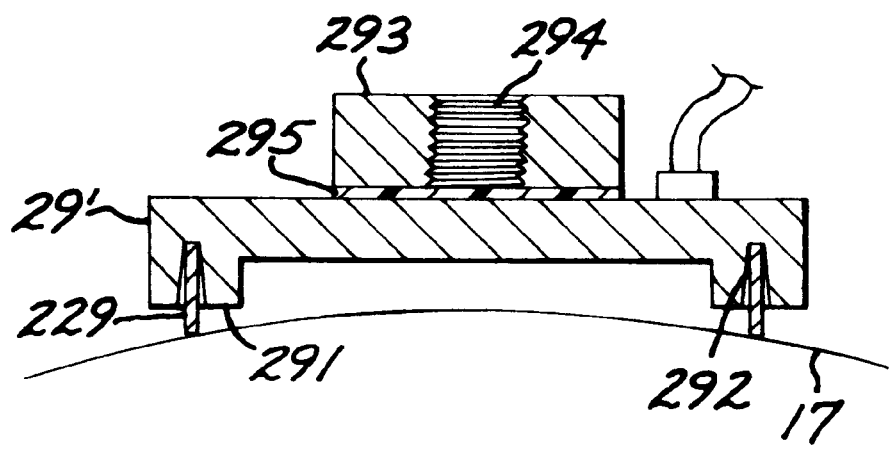
FIG. 7B is a cross-sectional view taken along line 7B—7B of FIG. 7A.

Alternatively, for example for an implementation wherein the attachment 229 is symmetrical about the axis of the cylinder, the pressure plate can be configured as an electrode 29' (FIGS. 7A–7B) that presses on and contacts substantially the entirety of the edge 229A that is opposite the protrusions 251. The electrode 29' is fabricated of copper in an exemplary embodiment, and includes a peripheral shoulder structure 291 having a tapered groove 292 formed therein to receive the edge 229A of the attachment 229. The electrode 29' is attached to steel mounting structure 293 by an electrical isolator structure 295, fabricated of an electrical nonconductor such as rubber or other flexible nonconductor. An opening 294 is formed in the mounting structure 293 to receive the cylinder rod. In this implementation, the current paths to the respective protrusions would be substantially identical in length. One or more anode cables runs from the transformer to the anode structure 29'. A plurality of anode cables can be employed to divide the power delivered from the same tap of the transformer, and attached at symmetrically located attachment points on the electrode 29'.

FIG. 8B further illustrates an exemplary cathode electrode structure 13' suitable for use in resistance welding the attachment 229. The structure 13' includes a peripheral shoulder 131 defining a peripheral curved contact surface 132, whose curvature matches the contour of the tank half section surface to be contacted. A steel mounting structure 133 is attached to the bottom of the electrode 13' for attaching to a cylinder rod.

While the protrusions are being pressed against the tank section, welding is enabled by operator actuation of the weld switch 45. Welding current flows through the protrusions 251 and the tank regions in close proximity thereto, which flow together pursuant to resistance produced heat and pressure provided by the air cylinders 11, 25, as schematically depicted in FIG. 10.

Tank sections respectively having a collar 129 and a footring 229 welded thereto in accordance with the invention can be joined to form a tank assembly 300 as shown in FIG. 11. In this exemplary embodiment, the tank assembly is sized for use as a 20 pound tank for holding LP gas under pressure. The tank assembly includes a fitting 302, e.g. a threaded NPT flange 302 to which a valve with pressure regulation can be attached.

In accordance with a further aspect of the invention, a pressure tank is fabricated employing resistance welding techniques for welding collar and base ring attachments to the head and bottom sections of the tank. Each of these metal parts is first fabricated using conventional techniques. For example, the collar and base rings and a blank head circle are typically fabricated using a progressive die technique. The top head is drawn from the head circle and a flange opening is formed using a draw die technique. The top head is offset to produce a lower edge of reduced diameter using an offsetter technique, so that the lower edge of the head will fit into the top peripheral edge of the bottom head. The bottom head is formed using a draw die technique, and trimmed using a trimmer technique. The threaded flange is then welded to the flange opening in the top head section, using an automatic MIG welding technique with filler material. To the extent just described, the fabrication technique steps are conventional. However, the collar and base rings are fabricated with the weld protrusions as described above, in accordance with an aspect of the invention.

In accordance with an aspect of the invention, the collar attachment is welded to the top head section using an automatic resistance welding technique as described above regarding FIG. 1. The weld time for this weld is on the order of 1/5th second for an exemplary embodiment and application. In a conventional fabrication tank process, the collar is welded to the top head using a manual MIG weld process with filler material, with a weld time on the order of 10 seconds. The base ring is similarly attached to the bottom head section using the automatic welding technique. Here again, in a conventional fabrication process, the base ring would be welded using a manual MIG welding process with filler material. A further step in the tank fabrication step is to join the top head section and the bottom head section, using an automatic MIG welding process with filler material. This further step is a conventional technique for joining the two tank head sections.

The foregoing has thus been a disclosure of a resistance welding technique that provides for fast and efficient welding of attachments to tank sections. The welding technique produces welds of high quality and repeatability, and can increase throughput dramatically. Cost reductions are achievable due to reduced labor and material costs, since the attachment can be performed more quickly than with manual MIG welding and without the expense of filler rods.

Figure 12:
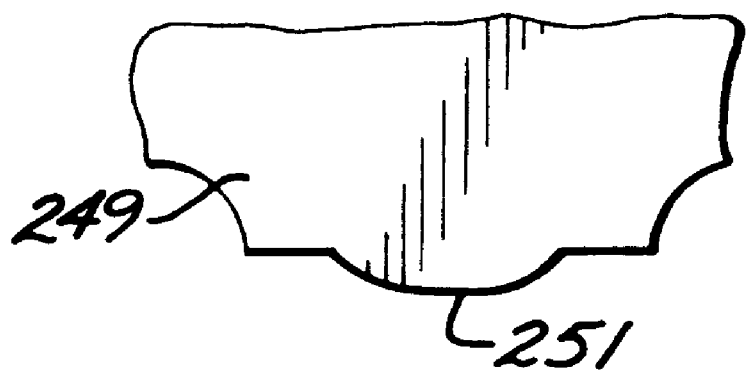
FIGS. 12 and 13 depict alternate forms of the weld protrusions integrally formed on the attachments.
Figure 13:
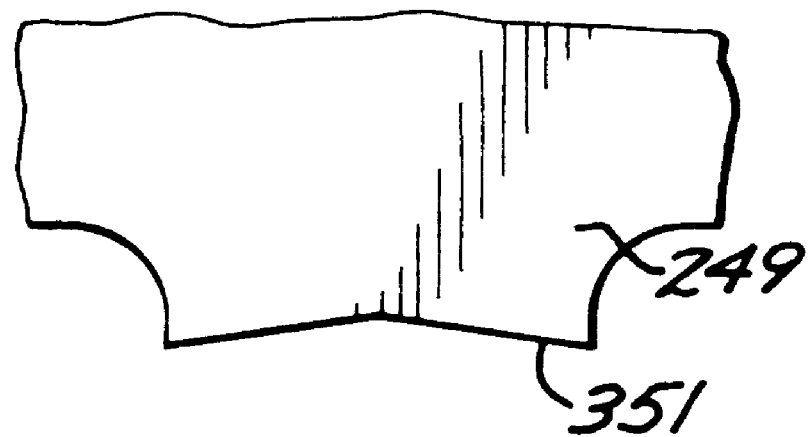

Other weld protrusion configurations could alternatively be employed. By way of example, FIGS. 12 and 13 show alternate configurations 251, 351 respectively. In one implementation, protrusion 251 has a radius of 0.5 inch, and its tip extends above the edge of the tab 249 by 0.078 inch. In another implementation, the outer tips of protrusion 351 extend from the trough between the tips by 0.078 inch, and are about 7/8 inch apart after pressure is applied and contact made with the tank section.

Although the foregoing has been a description and illustration of specific embodiments of the invention, various modifications and changes thereto can be made by persons skilled in the art without departing from the scope and spirit of the invention as defined by the following claims.

What is claimed is:

1. A method of welding an attachment to a tank section, comprising:
   providing an attachment having weld protrusions;
   welding the attachment to the tank section using only a resistance welding technique that comprises:
   (1) pressing the weld protrusions against a surface of the tank section;
   (2) while pressing, causing welding current to flow in the attachment through the protrusions to the portions of the tank section that are in contact with the weld protrusions along respective current paths in the attachment and the tank section of substantially equal length, so as to weld the protrusions with the tank section without the introduction of non-native weld filler material, to form weld joints;
   whereby the weld joints between the attachment and the tank section are substantially free of non-native weld filler.

2. The method of claim 1 wherein causing welding current to flow comprises:
   contacting the attachment with a first electrode structure at locations that produce substantially equal current paths from the electrode structure to respective protrusions;
   contacting the tank section with a second electrode structure at locations that produce substantially equal current paths from the second electrode structure to the regions in contact with the weld protrusions.

3. The method of claim 2 wherein contacting the attachment with a first electrode structure comprises contacting the attachment with a plurality of electrodes.

4. The method of claim 3 wherein contacting the attachment with a plurality of electrodes comprises contacting the attachment with a plurality of electrodes at locations that are close to the weld protrusions.

5. The method of claim 2 wherein contacting the tank section with a second electrode structure comprises contacting the tank section with an annular electrode.

6. A method of welding a curved attachment to a tank section comprising:
   providing a curved attachment having a plurality of welding protrusions along an edge that extends between spaced apart ends;
   welding the curved attachment to the tank section using only a resistance welding technique that comprises:
   (1) pressing the weld protrusions against a surface of the tank section;
   (2) contacting the attachment with a plurality of electrodes at locations that produce substantially equal current paths from the electrodes to the protrusions;
   (3) contacting the tank section with an electrode structure;
   (4) energizing the plurality of electrodes and the electrode structure, so as to weld the protrusions with the tank section without the introduction of non-native weld filler material, to form weld joints;
   whereby the weld joints between the attachment and the tank section are substantially free of non-native weld filler.

7. The method of claim 6 wherein contacting the attachment with a plurality of electrodes comprises contacting the attachment with a plurality of electrodes at locations that are close to the weld protrusions.

8. The method of claim 6 wherein contacting the tank section with an electrode structure comprises contacting the tank section with a curved electrode structure.

9. A method of welding to a tank section a ring shaped attachment having a first edge with welding protrusions and a second edge opposite the first edge, comprising:
   welding the ring shaped attachment to the tank section using only a resistance welding technique that includes:
   (1) pressing a first electrode structure against the second edge so that the weld protrusions press against a surface of the tank section;
   (2) contacting the tank section with a second electrode structure;
   (3) energizing the first electrode structure and the second electrode structure, so as to weld the protrusions with the tank section without the introduction of non-native weld filler material, to form weld joints;
   whereby the weld joints between the attachment and the tank section are substantially free of non-native weld filler.

10. The method of claim 9 wherein pressing a first electrode structure comprises pressing an electrode against substantially the entirety of the first edge.

11. The method of claim 9 wherein contacting the tank section with a second electrode structure comprises contacting the tank section with an annular electrode.

12. A method of fabricating a pressure tank vessel, comprising:

providing a metal collar having a set of collar weld protrusions, a top head section, a bottom head section, and a base ring having a set of base ring weld protrusions;

welding the collar to the top head section using only a resistance welding technique, said resistance welding technique comprising pressing the weld protrusions against a surface of the top head section, and while pressing, causing welding current to flow in the metal collar through the collar protrusions to the portions of the top head section that are in contact with the collar weld protrusions along respective current paths in the collar and the tank section of substantially equal length, causing heat to rapidly build in the collar protrusions and the collar protrusions to fuse with the top head section without the introduction of non-native weld filler material;

welding the base ring to the bottom head section using only the resistance welding technique, comprising pressing the base weld protrusions against a surface of the bottom head section, and while pressing, causing welding current to flow in the metal base ring through the base ring protrusions to the portions of the bottom head section that are in contact with the base weld protrusions, causing heat to rapidly build in the base ring protrusions and the base ring protrusions to fuse with the bottom head section without the introduction of non-native weld filler material; and welding the top head section and the bottom head section together to form the tank vessel;

whereby weld joints between the collar and the top head section are substantially free of non-native weld filler material, and whereby the weld joints between the base ring and the bottom head section are substantially free of non-native weld filler material.

13. The method of claim 12 wherein the step of welding the top head section and the bottom head section together comprises adding filler material during said welding to form a weld joint.

14. The method of claim 12, wherein top head section includes a flange opening, the method further including:

welding a threaded flange to said flange opening of said top head section.

15. A pressure tank vessel fabricated by the method of claim 12.

* * * * *